United States Patent
Resio et al.

(10) Patent No.: US 10,514,020 B1
(45) Date of Patent: Dec. 24, 2019

(54) INTEGRATED SYSTEM FOR OPTIMAL CONTINUOUS EXTRACTION OF HEAD-DRIVEN TIDAL ENERGY WITH MINIMAL OR NO ADVERSE ENVIRONMENTAL EFFECTS

(71) Applicants: Donald Thomas Resio, Ponte Vedra, FL (US); William T. Fletcher, Jacksonville, FL (US); Michelle Ann Vieira, Atlantic Beach, FL (US)

(72) Inventors: Donald Thomas Resio, Ponte Vedra, FL (US); William T. Fletcher, Jacksonville, FL (US); Michelle Ann Vieira, Atlantic Beach, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 0 days.

(21) Appl. No.: 16/429,840

(22) Filed: Jun. 3, 2019

(51) Int. Cl.
*F03B 13/26* (2006.01)

(52) U.S. Cl.
CPC ............ *F03B 13/26* (2013.01); *F03B 13/264* (2013.01)

(58) Field of Classification Search
CPC ........ F03B 13/26; F03B 13/264; Y02E 10/28; Y02E 10/38
USPC .......................................................... 60/398
See application file for complete search history.

(56) References Cited

U.S. PATENT DOCUMENTS

| 4,288,985 | A * | 9/1981 | Dyck ................... | F03B 13/264 60/398 |
| 9,243,608 | B1 * | 1/2016 | Smith ................... | F03B 13/264 |
| 9,644,600 | B2 | 5/2017 | Kldosari | |
| 2006/0202483 | A1 | 9/2006 | Gonzalez | |
| 2010/0276935 | A1 | 11/2010 | Dehlsen et al. | |
| 2011/0081259 | A1 | 4/2011 | Vowles | |
| 2015/0211480 | A1 | 7/2015 | Pingitore et al. | |
| 2017/0089318 | A1 | 3/2017 | Aldosari | |

FOREIGN PATENT DOCUMENTS

| GB | 2454913 A | 5/2009 |
| WO | 2019035883 A1 | 2/2019 |

OTHER PUBLICATIONS

International Search Report and Written Opinion for PCT/US2019/035560 (filing date: Jun. 5, 2019) dated Aug. 8, 2019; Applicant: University of North Florida Board of Trustees.
International Search Report and Written Opinion for PCT/US18/00147 (filing date: Aug. 15, 2018) dated Jan. 4, 2019; Applicant: University of North Florida Board of Trustees.

* cited by examiner

*Primary Examiner* — Michael Leslie
(74) *Attorney, Agent, or Firm* — Paul Murty; Smith & Hopen, P.A.

(57) ABSTRACT

A closed system that captures energy derived from the head differential rather than open-water flows velocities while reducing potential environmental damages and costly maintenance due to bio-fouling. The continuously derived energy system utilizes an offshore bladder in communication with both a primary onshore bladder and a supplemental onshore bladder. Tidal energy is captured by turbines as fluid is transferred between the bladders. In addition, the system continuously extracts energy by diverting fluid to and from the supplemental onshore bladder during periods of near-high-ride and near-low-tide, during which the pressure differential between the offshore bladder and the primary onshore bladder becomes inefficient for energy production.

15 Claims, 4 Drawing Sheets

Fig. 1—PRIOR ART

INTEGRATED SYSTEM FOR OPTIMAL CONTINUOUS EXTRACTION OF HEAD-DRIVEN TIDAL ENERGY WITH MINIMAL OR NO ADVERSE ENVIRONMENTAL EFFECTS

BACKGROUND OF THE INVENTION

1. Field of the Invention

This invention relates, generally, to tidal energy. More specifically, it relates to closed tidal energy systems capable of capturing a continuous supply of tidal energy from areas of low flow velocity.

2. Brief Description of the Prior Art

Capturing hydropower from tides due to the rise and fall of sea levels is known in the art. Hydropower converts power obtained from tides into power, resulting in tidal energy. Existing systems for generating tidal energy are based on one of two concepts: (1) capturing fixed sections of currents flowing through a rotor (coupled with a turbine), optimally oriented orthogonal to the flow; and (2) using water-level gradient to drive a flow through a pipe/conduit which contains a turbine. Because of this, conventional tidal systems tend to be located/considered only in sites where flow velocities are high, which are typically coincident with regions of high tidal range or in areas of natural flow convergence, such as inlets. However, siting in these areas typically creates significant problems with potential system damage due to debris, biofouling, corrosion, and environmental impacts, and often are in competition with navigation for space in inlets.

Additionally, both flow-driven systems and head-driven systems, which use available seawater as their flow medium, are subject to damage by debris impacts, biofouling, and corrosion, and can have a very negative impact on fish and other aspects of the local ecology. Alternative systems have been proposed utilizing closed bladders in the offshore tidal area; however, it is obvious that the open onshore system, even if initially pristine, would eventually contain biological materials that would lead to biofouling within the system.

Other renewable energy capture devices, such as wind turbines, photovoltaic cells, hydropower systems, solar concentration plants, and other traditional tidal range plants are known. Currently, wind energy and their corresponding turbines offer a technology that is effective in high sustained-wind regions but cannot be implemented in coastal areas. Further, wind turbines under 100-kilowatt cost between $3000 to $8000 per kilowatt of capacity. At the utility scale, this initial construction cost is between $1.3-$2.2 million per MW of nameplate capacity. It is important to note that nameplate capacity of wind turbines and other energy producing plants is then scaled back by a capacity factor. Wind has an average capacity factor of 25% to 33%, meaning that wind farms will only achieve their nameplate capacity rating 1/4 to 1/3 of their run time. This is due to inconsistent wind speeds, variability in wind directions, and time periods when no wind in present. Furthermore, non-tidal renewable energy sources typically require a backup energy source, such as fuel, to provide energy with the renewable source is unavailable, particularly when the renewable source is unpredictable in its availability.

Tidal plants, in contrast, rely on a much more constant and predictable ebb and flow of the tides. These plants can be much more reliable than other energies such as wind and solar. The potential for energy harness from tidal energy is promising considering the total global potential for ocean tidal power has been estimated at 64,000 MW. However, as discussed, current hydropower systems rely on the existence of high tidal ranges and available connection conduits into existing inland water bodies, which are not prevalent in coastal regions along the Gulf Coast and East Coast (south of New England) of the United States. For example, there is potential for harvesting energy from the flow in the St. Johns River and other major rivers along these coastal areas, but the energy density is so small that it is economically impractical to do this on a commercial scale. Moreover, systems such as those described in WO 2019/035883 utilize the discontinuous capture of head-driven tidal energy, often requiring a shut-off valve to stop flow and energy product when the head differential drops below a threshold value and energy production becomes inefficient. During a semi-diurnal tide cycle, such a shut-off valve would be required about every 6.125 hours, as shown in prior art FIG. 1, which depicts tide levels (graphically represented as a solid line and indicated by reference numeral 100) and onshore bladder fluid-content levels (graphically represented as a broken line and indicated by reference numeral 110). In FIG. 1, reference numeral 120 corresponds to a period of approximately high-tide, during which a shut-off valve must be utilized; similarly, reference numeral 130 corresponds to a period of approximately low-tide, during which the shut-off valve must be utilized. During the times indicated by reference numerals 120 and 130, the water level differences between onshore and offshore bladders are too low to generate practical levels of energy, thereby requiring the use of the shut-off valves. Also shown in FIG. 1 As FIG. 1 shows, the shut-off valves are required after approximately six hours and 12.5 minutes, or every 6.125 hours, as noted above.

Accordingly, what is needed is a system that optimally continuously extracts head-driven tidal energy with minimal or no adverse environmental effects. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system that optimally continuously extracts head-driven tidal energy with reduced negative environmental effects, thereby allowing for the extraction of tidal energy in non-traditional areas, is now met by a new, useful, and nonobvious invention.

The novel closed, continuous system includes an offshore bladder in communication with each of a primary onshore bladder and a supplemental onshore bladder. The offshore bladder is coupled to the primary onshore bladder via an onshore flow line that includes an onshore flow turbine. Similarly, the primary onshore bladder is coupled to the offshore bladder via an offshore flow line that includes an offshore flow turbine. A high-tide diversion line branches from the onshore flow line into the supplemental onshore bladder, and a low-tide diversion line branches from the offshore flow line to the supplemental onshore bladder. A fluid is disposed within the system, such that the fluid is adapted to flow between the offshore bladder and the primary onshore bladder via the onshore flow line; between the primary onshore bladder and the offshore bladder via the offshore flow line; into the supplemental onshore bladder from the onshore flow line via the high-tide diversion line; and out of the supplemental onshore bladder and into the offshore bladder flow line via the low-tide diversion line. When the fluid flows through the onshore flow line, head-driven tidal energy is extracted by an onshore flow turbine; similarly, when the fluid flows through the offshore flow line, head-driven tidal energy is extracted by an offshore flow turbine.

One or more of the bladders may be made of a compliant material, such that the bladder allows the fluid to flow between the bladders with minimal lost energy due to friction, thereby maximizing the head-driven tidal energy extracted from the system. In addition, one or more of the bladders may be oversized, such that the bladder is adapted to contain a total volume of the fluid within the system. One or more of the bladders may include a floating barrier disposed therein, the floating barrier separating an air layer from an amount of the fluid disposed within the offshore bladder. In this embodiment, an inflow conduit enters into the bladder and terminates within the bladder at a point above the floating barrier within the air layer to introduce fluid into the air layer of the bladder. An outflow conduit departs from the bladder at a point that is in communication with the amount of the fluid, such that the amount of air leaving the bladder is minimized.

A novel method of continuously extracting head-driven tidal energy via a closed system while minimizing negative environmental effects is also provided by the present invention. The method includes a step of creating a closed system by connecting an offshore bladder to a primary onshore bladder via an onshore flow line and an offshore flow line; connecting the onshore flow line to a supplemental onshore bladder via a high-tide diversion line; and connecting the supplemental onshore bladder to the offshore flow line via a low-tide diversion line. A volume of fluid is disposed within the system, such as within the offshore bladder.

As a tide level surrounding the offshore bladder rises, fluid from the offshore bladder is transferred to the primary onshore bladder via the onshore flow line. During this fluid transfer, head-driven tidal energy is captured by an onshore flow turbine in communication with the onshore flow line. As the tide level surrounding the offshore bladder reaches a near-high-tide level, a portion of the fluid from the onshore flow line is diverted into the supplemental onshore bladder to provide for continuous flow of fluid within the onshore flow line. Similarly, as the tide level surrounding the offshore bladder lowers, fluid is transferred from the primary onshore bladder to the offshore bladder via the offshore flow line. During this fluid transfer, head-driven tidal energy is captured by an offshore flow turbine in communication with the offshore flow line. As the tide level surrounding the offshore bladder reaches a near-low-tide level, a portion of the fluid is transferred from the supplemental onshore bladder into the offshore flow line to provide for continuous flow of fluid within the offshore flow line.

An object of the invention is to provide for the continuous extraction of tidal energy that does not rely on the slope of an ocean floor or on shut-off valves, thereby expanding the area in which tidal energy can be captured and used as a renewable energy source and expanding the total amount of tidal energy that can be captured.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
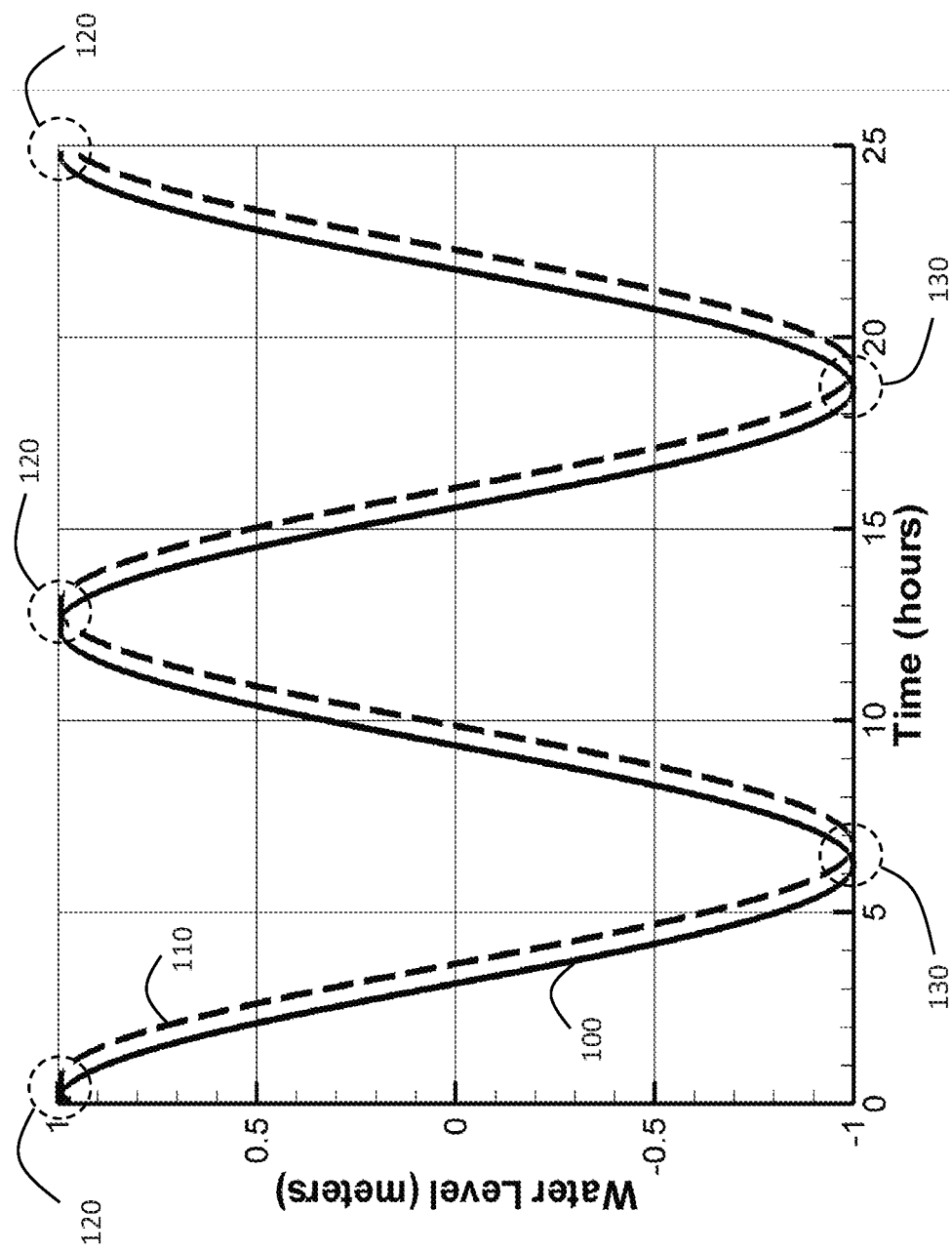
FIG. 1 is a graphical representation of a water level over time, showing peaks during high-tide and low-tide, as well as a prior art method of discontinuous tidal energy extraction over time.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In certain embodiments, the current invention allows for scalable, continuous energy generation from tides, even in areas with relatively small tidal ranges, while avoiding many of the traditional pitfalls of existing technologies, such as bio-fouling, harm to marine ecosystems, damages to turbines due to debris in the water and wear on moving parts due to sediment and other suspended materials in the water. This system has the flexibility to be used in residential and commercial energy production applications. Additionally, the need for system maintenance is greatly reduced by placing the turbines on land for easy accessibility, which also permits easier access to the energy grid.

Coastal regions along most of the East and Gulf Coasts of the United States, and many other areas around the world, are located where (1) topographic slopes are very low for substantial distances inland, (2) wind speeds are quite low, and (3) tidal energy is presently not considered economically feasible. Thus, coastal regions are typically only able to utilize solar (photo-voltaic) sources to generate "green energy." As discussed herein, the current invention has the potential to solve this long-felt but unresolved need and provide these coastal regions with much needed additional options for "green energy" power generation.

In an embodiment, the current invention is a closed system the utilizes an offshore bladder in fluidic communication with a main onshore bladder and a supplemental onshore bladder in a continuous head-driven tidal energy capture system. Using a closed system containing a specific volume of liquid within the connected compliant bladders, together with hydropower turbines located between the bladders, the system captures potential energy within the head differentials over a tidal cycle. Moreover, by utilizing a supplemental onshore bladder in communication with each of the main onshore bladder and the offshore bladder, the system experiences continuous energy extraction without the need for a shut-off valve or other downtime in energy capture. The compliant bladders can be scaled from small, residential-size systems up to commercial applications to accommodate local needs and meet a diverse set of applications. The bladders can also be designed to conform to specific local environmental conditions and constraints.

Figure 2:
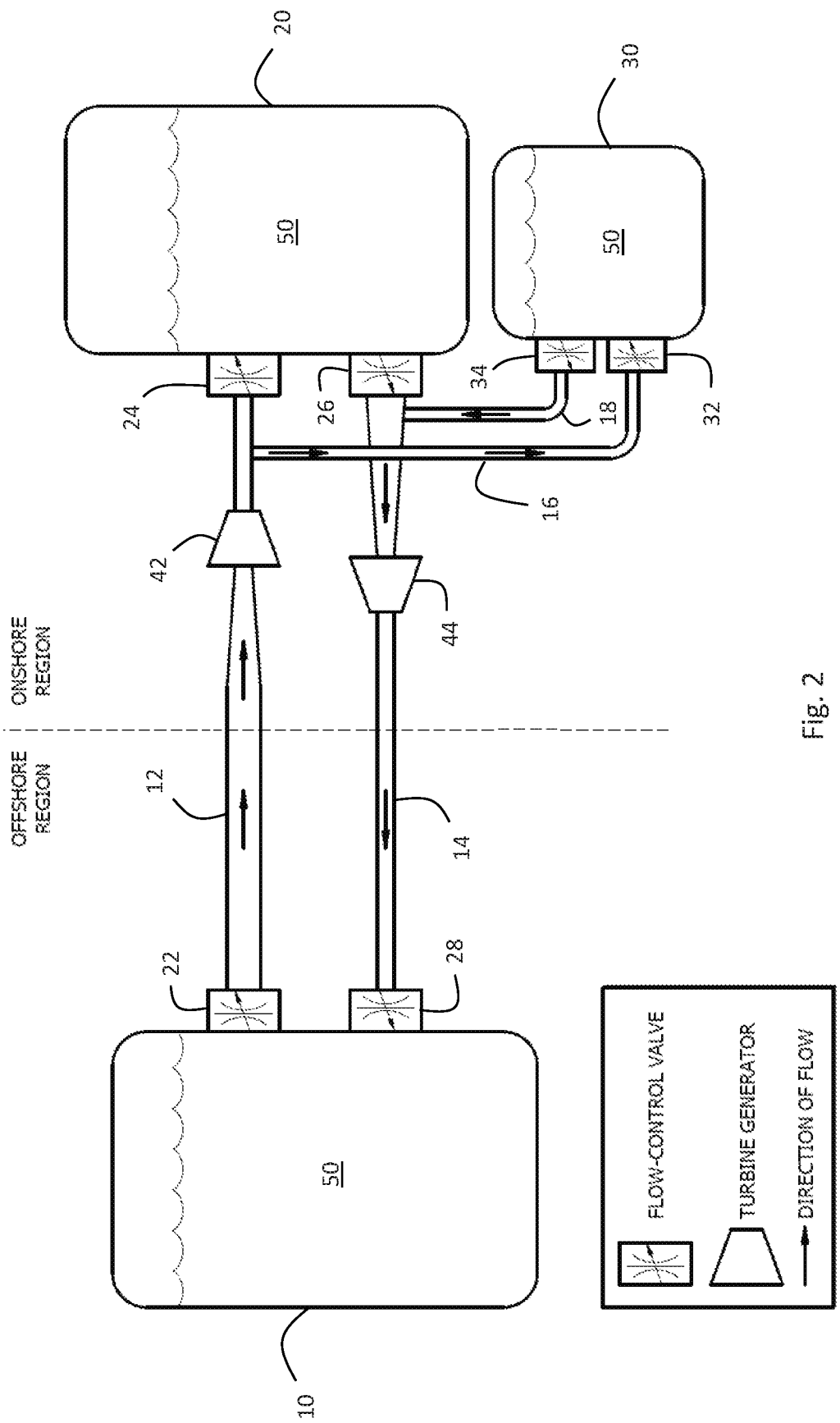
FIG. 2 is a schematic overview of a continuous tidal energy extraction system employing a supplemental bladder, in accordance with an embodiment of the instant invention.

An embodiment of the closed system is shown schematically in FIG. 2. As shown in FIG. 2, the system includes offshore bladder 10, primary onshore bladder 20, and supplemental onshore bladder 30. Each of the bladders 10, 20, and 30 include an amount of fluid 50 disposed therein. Moreover, at least offshore bladder 10 and primary offshore bladder 20 are oversized and made of compliant material, such that the bladders 10, 20 can contain the entire volume of fluid 50 housed within the system at any given time. The oversized nature of the bladders also allows each bladder to expand upward and contract downward within a surrounding environment, depending on a water level above offshore bladder 10. In addition, the compliant material of the bladders minimizes the loss of energy due to friction when fluid 50 moves between the bladders. The bladders are designed such that the system maximizes the pressure differential between offshore bladder 10 and primary onshore bladder 20, particularly when the bladders expand upward and contract downward based on the water level surrounding offshore bladder 10. In addition, supplemental onshore bladder 30 is made of a compliant material and may be oversized such that the entire volume of fluid 50 can be housed therein; however, supplemental onshore bladder 30 may be smaller than each of offshore bladder 10 and primary onshore bladder 20, because supplemental onshore bladder 30 is designed as an overflow reservoir, which will be described in greater detail in the sections below.

The bladder system shown in FIG. 2 is closed to an environment external to bladders 10, 20, and 30 due to the flow lines spanning between the bladders. Specifically, the system includes onshore flow line 12 between offshore bladder 10 and primary onshore bladder 20, with onshore flow line 12 disposed to translate fluid 50 from offshore bladder 10 to onshore bladder 20. Fluid 50 leaves offshore bladder 10 via onshore flow control valve 22 and enters primary onshore bladder 20 via onshore flow control valve 22. Onshore flow turbine 42 captures energy from fluid 50 flowing from offshore bladder 10 to primary onshore bladder 20.

Primary onshore bladder 20 and offshore bladder 10 are also coupled together via offshore flow line 14, through which fluid 50 leaves primary onshore bladder 20 and enters offshore bladder 10. Fluid 50 flowing through offshore flow line 14 is controlled via offshore flow control valve 26 secured to primary onshore bladder 20, and via offshore flow control valve 28 secured to offshore bladder 10. Offshore flow turbine 44 captures energy from fluid 50 flowing from primary onshore bladder 20 to offshore bladder. It is appreciated that onshore flow turbine 42 and offshore flow turbine 44 can include various components to help capture tidal energy and turn the energy into a usable form, such as a hydropower turbine in communication with a generator, such that the turbines turn as a result of a pressure differential between the bladders. The turbines may include manifolds on the generators to capture more tidal energy by easing the path of the liquid through the generator, thereby minimizing the amount of energy lost due to friction or as heat energy.

The bladder system shown in FIG. 2 also includes supplemental onshore bladder 30, which is in indirect fluidic communication with offshore bladder 10 via high-tide diversion line 16 and low-tide diversion line 18. As discussed above, during periods of near-high-tide and near-low-tide, the flow of fluid 50 between offshore bladder 10 and primary onshore bladder 20 slows to a stop as the head differential drops below a threshold value and energy production becomes inefficient. In prior art systems, a shut-off valve is used to prevent the energy waste that would typically be associated with high- and low-tides. However, the bladder system includes supplemental onshore bladder 30 that is coupled to offshore bladder 10 via high-tide diversion line 16 and low-tide diversion line 18, thereby obviating the need for a shut-off valve. Instead, during periods of high-tide, fluid 50 flowing from offshore bladder 10 to primary onshore bladder 20 is diverted via high-tide diversion line 16 to supplemental onshore bladder 30, with the flow of fluid 50 into supplemental onshore bladder 30 being controlled by supplemental inflow control valve 32. Accordingly, instead of requiring a shutdown of fluid 50 flow (i.e., a discontinuous energy capture system), fluid 50 continues to flow in a continuous energy capture system into the reservoir provided by supplemental onshore bladder 20. Similarly, during periods of low-tide, the amount of fluid 50 that was diverted into supplemental onshore bladder 30 is transferred to offshore bladder 10 via low-tide diversion line 18, with the flow of fluid 50 out of supplemental onshore bladder 30 being controlled by supplemental outflow control valve 34.

In use, starting at a zero-tide level on a tide rising toward high-tide, the water level above offshore bladder 10 increases until the pressure differential between offshore bladder 10 and primary onshore bladder 20 is capable of generating power from flow of fluid 50 through onshore flow turbine 42. At that time, onshore flow control valve 22 opens and allows for the flow of fluid 50 into onshore flow line 12 from offshore bladder 10, through onshore flow turbine 42, and into primary onshore bladder 20 as onshore flow control valve 24 opens. Energy is thereby captured via onshore flow turbine 42. As the tide level approaches high-tide and the pressure differential between offshore bladder 10 and primary onshore bladder 20 decreases, supplemental inflow control valve 32 opens and an amount of fluid 50 is diverted through high-tide diversion line 16 and into supplemental onshore bladder 30. As the tide level lowers, offshore flow control valve 26 opens, allowing fluid 50 to flow from primary onshore bladder 20 toward offshore bladder 10 through offshore flow line 14, with offshore flow control valve 28 opening to allow fluid 50 into offshore bladder 10. Energy is captured via offshore flow turbine 44. Similar to the high-tide flow described above, as the tide level approaches low-tide and the pressure differential between primary onshore bladder 20 and offshore bladder 10 decreases, supplemental outflow control valve 34 opens and an amount of fluid 50 is diverted through low-tide diversion line 18 and into offshore bladder 10.

Figure 3:
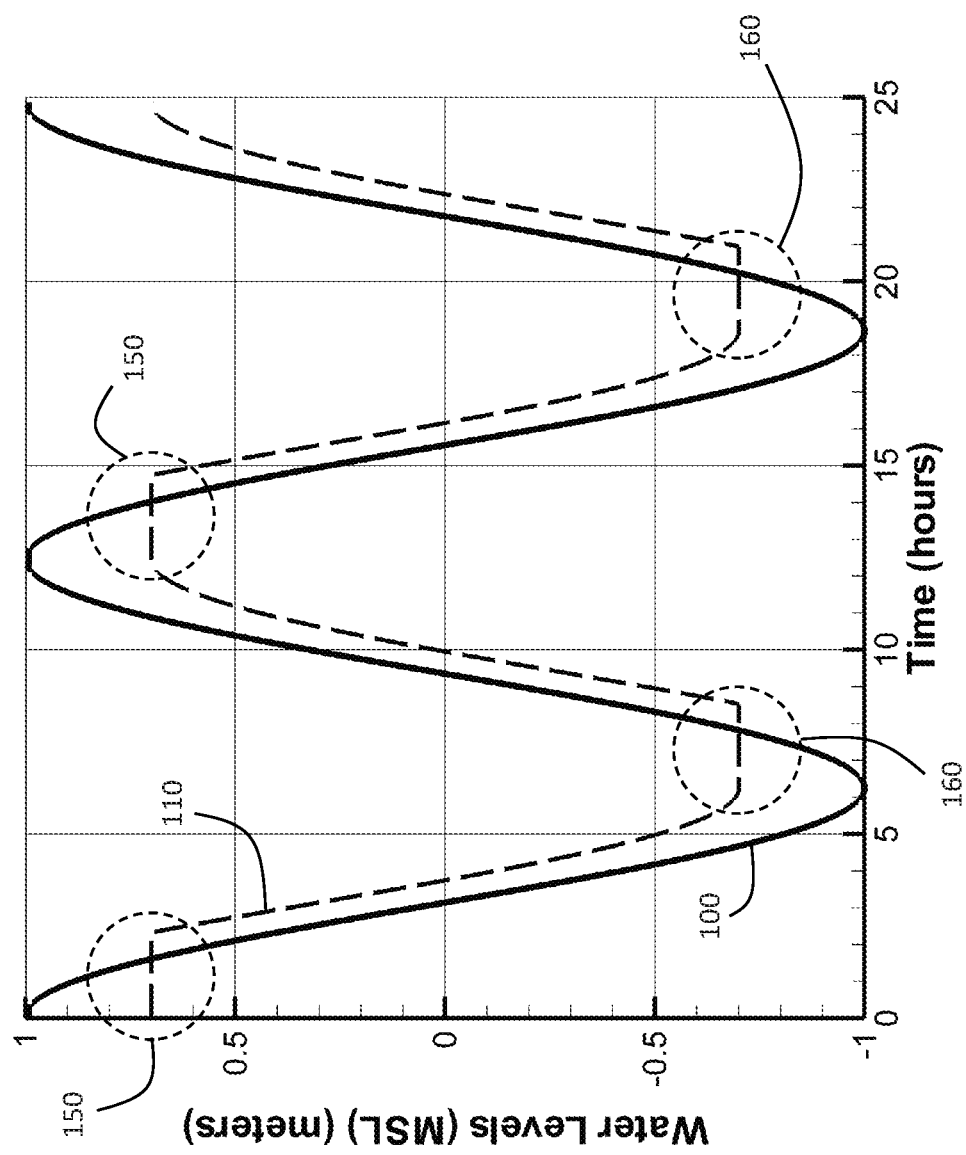
FIG. 3 is a graphical representation of a tidal water level over time, showing peaks during high-tide and low-tide, as well as fluid level within a primary onshore bladder over time, in accordance with an embodiment of the instant invention.

FIG. 3 graphically shows the flow of fluid 50 between offshore bladder 10 and primary onshore bladder 20 as compared with tidal water levels. Similar to the graphical depiction of FIG. 1, the tidal water level is depicted as a solid line and referred to as reference numeral 100, and the fluid level within primary onshore bladder 20 is depicted as a broken line and referred to as reference numeral 110. As shown in FIG. 1, during periods of near-high-tide (referred to as reference numeral 150) and periods of near-low-tide (referred to as reference numeral 160), the level of fluid 50 within primary onshore bladder 20 stagnates for a period of time. During that time, as discussed above, fluid 50 is instead diverted either into supplemental onshore bladder 30 (during near-high-tide periods of time, which, as used herein, means the time of the highest tide ±two hours) or out of supplemental onshore bladder 30 (during near-low-tide periods of time, which, as used herein, means the time of the lowest tide ±two hours). Accordingly, while the level of fluid 50 within primary onshore bladder 20 stagnates, the flow of fluid 50 through the system (and, importantly, through onshore flow turbine 42 and offshore flow turbine 44) remains continuous due to the diversion of fluid 50 into and out of supplemental onshore bladder 30.

Figure 4:
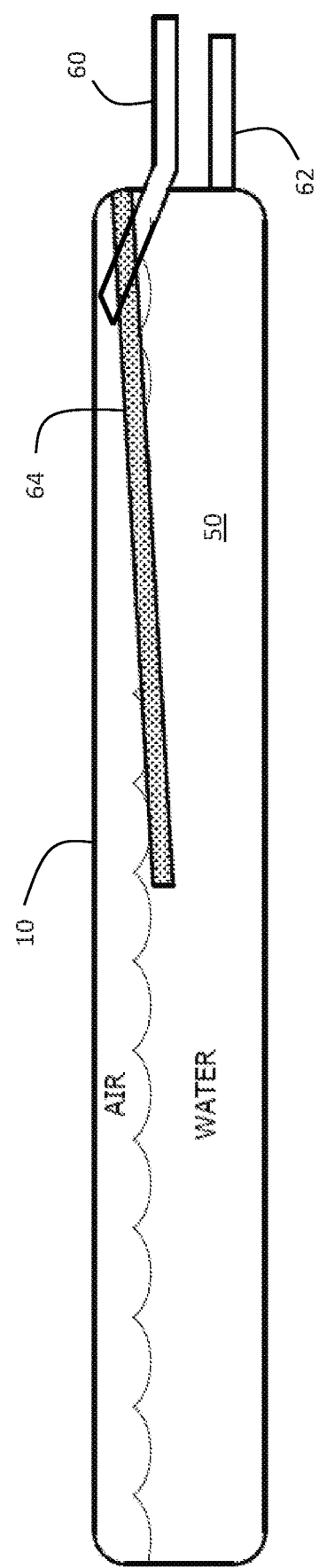
FIG. 4 is a cross-sectional view of an embodiment of a bladder used in the continuous tidal energy extraction system of FIG. 2.

FIG. 4 shows an embodiment of offshore bladder 10, however, it is appreciated that one or more of primary onshore bladder 20 and supplemental onshore bladder 30 may have similar features as the depiction of offshore bladder 10 in FIG. 4. As shown in FIG. 4, an embodiment of offshore bladder 10 includes inflow conduit 60 adapted to carry fluid 50 into offshore bladder 10, as well as outflow conduit 62 adapted to carry fluid 50 out of offshore bladder 10. In the embodiment shown in FIG. 4, inflow conduit 60 is coupled to offshore flow line 14 to transfer fluid 50 into offshore bladder 10, and outflow conduit 62 is coupled to onshore flow line 12 to transfer fluid 50 out of offshore bladder 10. Also shown in FIG. 4 is floating barrier 64, which is disposed within offshore bladder 10 and separates an air layer from a layer of fluid 50. Floating barrier 64 separates the point at which fluid 50 enters offshore bladder 10 from the amount of fluid 50 disposed within offshore bladder 10. As such, inflow conduit 60 terminates at a point above floating barrier 64, such that inflow conduit 60 transfers fluid 50 into the air layer above floating barrier 64 prior to fluid 50 mixing with the amount of fluid 50 previously disposed within offshore bladder 10. Accordingly, floating barrier 64 reduces the deceleration of fluid 50 flowing into offshore bladder 10 which would be experiences if fluid 50 flowed directly into the amount of fluid 50 within offshore bladder 10; instead, fluid 50 encounters the air layer prior to intermixing with the amount of fluid 50 within offshore bladder 10. Outflow conduit 62 is disposed at a bottom of offshore bladder 10 to minimize an amount of air leaving offshore bladder 10 via outflow conduit 62. As discussed above, while FIG. 4 depicts offshore bladder 10, it is appreciated that one or more of primary onshore bladder 20 and supplemental onshore bladder 30 may include an identical configuration as that shown for offshore bladder 10 in FIG. 4.

The bladder system may introduce convergence and nozzles to increase the flow velocity of the liquid within the system. Both convergence and nozzle components are designed to decrease the area through which liquid can pass through the system. As a result of the decrease in the possible area through which the liquid can travel when moving between the primary onshore bladder 20 and offshore bladder 10, and between supplemental onshore bladder 30 and offshore bladder 10, the system can control and increase the flow velocity of the liquid. By increasing the flow velocity, the system can increase the tidal energy captured as a result of the movement of the bladders, and as a result of the movement of the liquid within the system between the bladders.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A closed system for continuous extraction of head-driven tidal energy, the system comprising:
   an offshore bladder in communication with each of a primary onshore bladder and a supplemental onshore bladder;
   an onshore flow line coupling the offshore bladder to the primary onshore bladder, the onshore flow line including an onshore flow turbine;
   a high-tide diversion line branching from the onshore flow line to the supplemental onshore bladder;
   an offshore flow line coupling the primary onshore bladder to the offshore bladder, the offshore flow line including an offshore flow turbine;
   a low-tide diversion line branching from the offshore flow line to the supplemental onshore bladder; and
   a fluid disposed within at least one of the offshore bladder, the primary onshore bladder, and the supplemental onshore bladder, the fluid adapted to flow between the offshore bladder and the primary onshore bladder, and between the supplemental onshore bladder and the offshore bladder, depending on a pressure differential between the bladders,
   wherein head-driven tidal energy is captured by at least one of the onshore flow turbine and the offshore flow turbine by altering a tidal water level above the offshore bladder, thereby altering the pressure differential between the bladders and thereby transferring an amount of the fluid between the bladders.

2. The system of claim 1, wherein each of the offshore bladder, the primary onshore bladder, and the supplemental onshore bladder is made of a compliant material, such that each of the bladders allows the fluid to flow between the bladders with minimal lost energy due to friction, thereby maximizing the head-driven tidal energy extracted from the system.

3. The system of claim 1, wherein the offshore bladder is oversized, such that the offshore bladder is adapted to contain a total volume of the fluid.

4. The system of claim 1, wherein the onshore flow line is adapted to transfer the fluid from the offshore bladder to the primary onshore bladder.

5. The system of claim 4, wherein the high-tide diversion line couples to the onshore flow line between the onshore flow turbine and the primary onshore bladder, such that the onshore flow turbine is adapted to extract head-driven tidal energy from the system before an amount of the fluid is diverted to the supplemental onshore bladder via the high-tide diversion line.

6. The system of claim 4, further comprising an onshore flow control valve in communication with the primary onshore bladder, wherein the onshore flow control valve opens to allow the fluid to flow into the primary onshore bladder, and wherein the onshore flow control valve closes during a period of near-high-tide, thereby diverting the fluid to the supplemental onshore bladder.

7. The system of claim 6, further comprising a supplemental inflow control valve in communication with the supplemental onshore bladder, wherein the supplemental inflow control valve opens during the period of near-high-tide to allow the fluid to flow into the supplemental onshore bladder.

8. The system of claim 1, wherein the offshore flow line is adapted to transfer the fluid from the primary onshore bladder to the offshore bladder.

9. The system of claim 8, wherein the low-tide diversion line couples to the offshore flow line between the offshore flow turbine and the primary onshore bladder, such that the offshore flow turbine is adapted to extract head-driven tidal energy from the system after an amount of fluid is diverted from the supplemental onshore bladder to the offshore bladder via the low-tide diversion line.

10. The system of claim 8, further comprising an offshore flow control valve in communication with the primary onshore bladder, wherein the offshore flow control valve opens to allow the fluid to flow out of the primary onshore bladder, and wherein the onshore flow control valve closes during a period of near-low-tide.

11. The system of claim 10, further comprising a supplemental outflow control valve in communication with the supplemental onshore bladder, wherein the supplemental outflow control valve opens during the prior of near-low-tide to allow the fluid to flow into the offshore flow line.

12. The system of claim 1, wherein the offshore bladder further comprises a floating barrier disposed therein, the floating barrier separating an air layer from an amount of the fluid disposed within the offshore bladder.

13. The system of claim 12, further comprising an inflow conduit coupled to the offshore flow line, the inflow conduit terminating within the offshore bladder at a point above the floating barrier within the air layer, such that the inflow conduit introduces an amount of the fluid within the offshore flow line to the offshore bladder.

14. The system of claim 12, further comprising an outflow conduit coupled to the onshore flow line, the outflow conduit in communication with the offshore bladder at a point below the floating barrier, such that the outflow conduit removes an amount of the fluid from the offshore bladder to the onshore flow line while minimizing an amount of air from the air layer from being introduced to the onshore flow line.

15. A method of continuously extracting head-driven tidal energy via a closed system while minimizing negative environmental effects, the method comprising the steps of:
   creating a closed system by:
      connecting an offshore bladder to a primary onshore bladder via an onshore flow line and an offshore flow line;
      connecting the onshore flow line to a supplemental onshore bladder via a high-tide diversion line; and
      connecting the supplemental onshore bladder to the offshore flow line via a low-tide diversion line;
   disposing a volume of a fluid within the offshore bladder;
   as a tide level surrounding the offshore bladder rises, transferring, via the onshore flow line, the fluid from the offshore bladder to the primary onshore bladder, such that head-driven tidal energy is captured by an onshore flow turbine in communication with the onshore flow line as the fluid is transferred through the onshore flow line;
   as the tide level surrounding the offshore bladder reaches a near-high-tide level, diverting a portion of the fluid from the onshore flow line into the supplemental onshore bladder;
   as the tide level surrounding the offshore bladder lowers, transferring, via the offshore flow line, the fluid from the primary onshore bladder to the offshore bladder, such that head-driven tidal energy is captured by an offshore flow turbine in communication with the offshore flow line as the fluid is transferred through the offshore flow line; and
   as the tide level surrounding the offshore bladder reaches a near-low-tide level, transferring the portion of the fluid from the supplemental onshore bladder into the offshore flow line.

\* \* \* \* \*